US007006630B2

(12) United States Patent
Yu et al.

(10) Patent No.: US 7,006,630 B2
(45) Date of Patent: Feb. 28, 2006

(54) METHODS AND APPARATUS FOR DIGITAL CONTENT PROTECTION

(75) Inventors: Hong Heather Yu, Princeton Junction, NJ (US); Prabir Bhattacharya, Plainsboro, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 111 days.

(21) Appl. No.: 10/453,407

(22) Filed: Jun. 3, 2003

(65) Prior Publication Data

US 2004/0247120 A1 Dec. 9, 2004

(51) Int. Cl.
*H04N 7/167* (2006.01)

(52) U.S. Cl. ............ 380/201; 380/200; 380/202; 380/203; 382/100; 382/232; 348/14.01

(58) Field of Classification Search ............ 352/85–90, 352/133; 345/427; 380/200–203; 382/100, 382/232; 348/14.01
See application file for complete search history.

(56) References Cited

U.S. PATENT DOCUMENTS

| 5,642,423 A | 6/1997 | Embree ............ 381/22 |
| 5,798,818 A | 8/1998 | Derderian et al. ............ 352/31 |
| 5,818,941 A | 10/1998 | Embree ............ 381/22 |
| 5,848,155 A | 12/1998 | Cox ............ 380/4 |
| 5,930,050 A | 7/1999 | Dewald ............ 359/670 |
| 6,141,530 A | 10/2000 | Rabowsky ............ 455/3.1 |
| 6,231,190 B1 | 5/2001 | Dewald ............ 353/31 |
| 6,310,591 B1 | 10/2001 | Morgan et al. ............ 345/84 |
| 6,317,171 B1 | 11/2001 | Dewald ............ 348/756 |
| 6,384,893 B1 * | 5/2002 | Mercs et al. ............ 352/133 |
| 6,388,661 B1 | 5/2002 | Richards ............ 345/204 |
| 6,690,374 B1 * | 2/2004 | Park et al. ............ 345/427 |
| 6,809,792 B1 * | 10/2004 | Tehranchi et al. ............ 352/85 |

* cited by examiner

*Primary Examiner*—Ayaz Sheikh
*Assistant Examiner*—Longbit Chai
(74) *Attorney, Agent, or Firm*—Harness, Dickey & Pierce, PLC (57) ABSTRACT

A multilayer digital content protection system, particularly for a digital cinema application is provided. Detection of unauthorized activity at the time it is occurring is provided using a first protection layer. Two layers of imperceptible watermarks, one camcorder viewable and one camcorder invisible are inserted into unauthorized copies of the digital content with second and third protection layers. Strong near infrared is also used to degrade the quality of any attempted unauthorized recording of digital content using a camcorder.

32 Claims, 3 Drawing Sheets

METHODS AND APPARATUS FOR DIGITAL CONTENT PROTECTION

BACKGROUND OF THE INVENTION

The present invention relates to methods and apparatus for protecting digital content from unauthorized copying and for the detection thereof, and is particularly applicable when the digital content to be protected is in the form of a digital movie.

The increased use of digital content, particularly to provide digital movies, often referred to generally as digital cinema, has resulted in an increase in interest in protecting digital content from unauthorized copying. Such protection is particularly useful in digital cinema applications. Digital content can be protected by encryption only up to the moment of presentation, where it becomes vulnerable to unauthorized usage. Embedding digital watermarks in digital content is one known method for protecting such presentations from unauthorized use. In the case of media content watermarking, it is possible to hide some information imperceptibly in media content so as to provide information for determining, for example, the copyright holder, usage rules, date, time, and place of post-decryption theft, such as the use of camcorders in theaters. Visible watermarking may also be provided by, for example, overlaying visual patterns on digital images depending upon the particular requirements for protection and detection of unauthorized copying.

In particular, and with respect to digital cinema, the use of digital content may improve the film industry by transforming the nature of production, delivery and exhibition; by reducing distributor costs; by reducing the lure of piracy due to region-based market delay; and by making it easier for exhibitors to offer alternative content. However, many issues exist to ensure the protection of such digital content from unauthorized copying, and include, for example, secure distribution and display of the movie in digital form. Whether a digital movie is distributed as a set of discs, by means of satellite, or via other forms of networks, unauthorized and/or undetected copying of digital content is a significant risk. For example, first-run movies might be copied without permission for home viewing at the very onset of the theatrical release.

Methods that embed small amounts of information in media may not be suitable for on-the-fly digital watermarking such as that used for digital cinema content protection. Unauthorized analog on-the-fly copies, such as copies of digital cinema movies made by a hand-held camcorder, suffer severe distortion. This distortion may destroy the embedded watermark and inhibits the prevention and/or tracking of digitally-reproduced motion pictures that are recorded, for example, in a digital theater. Moreover, many kinds of watermarks are vulnerable to intentional attacks. Thus, digital watermarking alone can only provide a moderate level of security by means of tracking illegal distribution.

A number of data hiding techniques are known in the prior art. One known technique for data hiding is known as the "Patch Work" algorithm developed at M.I.T. and described by Gruhl and Bender in "Information Hiding to Foil The Casual Counterfeiter," at pp. 1–15 in *Information Hiding 1998 LNCS 1525*, Springer-Verlag, Berlin, which is hereby incorporated by reference in its entirety. This algorithm chooses a number of "patches" and then modifies the patches to change the statistical distribution for watermark embedding. Patch centers are defined in reference to the length and height of an image and a fixed pixel, for example, the [0, 0]th pixel of the image. Although this system is satisfactory for undistorted images, image distortion, such as rotation or nonlinear distortion, will introduce decoding errors.

Many other watermarking algorithms have been proposed. One popular fragile digital watermarking algorithm performs least significant bit modulation to embed a watermark W in the least significant bit (LSB) stream. Although this watermarking algorithm is among the easiest to implement in real time, it can be hindered or defeated by certain types of transformations and signal distortions.

U.S. Pat. No. 5,848,155 to Cox et al., which is hereby incorporated in its entirety by reference, describes a spread spectrum watermarking algorithm. This algorithm forms the basis for some of the most popular robust watermarking algorithms. Although the Cox et al. algorithm and many improved versions thereof can withstand certain types of signal processing noise (such as that add by low pass filtering, re-compression, and white noise addition), it does not fare as well over DA-AD (digital to analog, followed by analog to digital) conversions, geometrical image distortion, and large scale down sampling transformations that occur in digital cinema camcorder copying.

In U.S. Patent Publication No. 20020106103 to Jones, entitled "System and method for embedding a watermark signal that contains message data in a digital image" and which is hereby incorporated by reference in its entirety, there is described a suprathreshold watermarking algorithm that is useful for digital cinema. However, as it is an image-based algorithm, it, too, fares less well when subjected to various types of distortions, particularly geometrical image distortion.

SUMMARY OF THE INVENTION

There is therefore provided, in various configurations of the present invention, a method for protecting digital content, and more particularly to protecting digital movie content, with a multilayer protection system.

In one configuration of the present invention, a content protection system for digital cinema includes a first protection layer configured to detect presence of a recording device, a second protection layer configured to embed an electronic copy mark into digital content provided in digital cinema, and a third protection layer configured to embed an electronic watermark into digital content provided in digital cinema. The first protection layer may include surveillance cameras. The second protection layer may include a near infrared signal projector for degrading using near infrared light the quality of digital content copied in digital cinema. The third protection layer may include a watermark embedder for embedding a recording device invisible electronic watermark into digital content provided in digital cinema. The electronic copy mark is preferably visible to the recording device and the electronic watermark is preferably invisible to the recording device.

In another configuration of the present invention, a digital content protection system for protecting digital content displayed in a theater includes a first protection layer having a camera detector including at least two surveillance cameras configured to detect recording devices within a theater. A second protection layer is further provided having a near infrared signal projector and a strong signal embedder together configured to embed an imperceptible recording device visible copy mark on a recording device recorded copy of digital content being displayed in the theater. A third protection layer is also provided having a watermark generator and a watermark embedder, the watermark embedder provided in conjunction with a digital cinema movie projector and, in combination with the watermark generator, are together configured to embed an imperceptible recording device invisible watermark in the digital content displayed in the theater by the digital cinema movie projector. A copy mark and watermark detector for detecting embedded copy marks and watermarks in digital content also may be provided. A monitoring component configured to provide notification of a recording device detected within the theater by the camera detector additionally may be provided.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Configurations of the present invention provide a multilayer and nonlinear digital cinema content protection system that includes security technologies (e.g., conventional security systems) and advanced content protection techniques to protect digital content (e.g., digital movie content), which may, for example, assist in the prevention of illegal distribution of content in digital cinema. In various configurations of the present invention, the multilayer protection system embeds imperceptible messages into a digital movie recorded, for example, by a handheld camcorder, using both camcorder visible and camcorder invisible signal embedding techniques as described herein.

Figure 1:
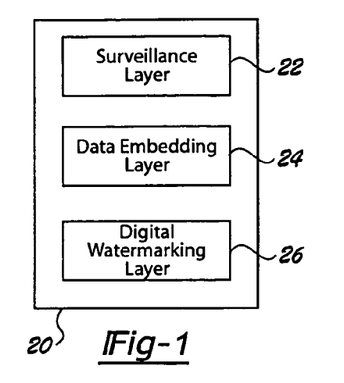
FIG. 1 is a simplified block diagram of various configurations of a representative multilayer digital cinema content protection system.

In various configurations of the present invention represented by FIG. 1, a multilayer digital cinema content protection system 20 includes three protection layers: a first protection layer 22, a second protection layer 24 and a third protection layer 26. In these configurations, the first protection layer 22 is configured as a surveillance layer, the second protection layer 24 is configured as a data embedding layer, and the third layer 26 is configured as a digital watermarking layer, together operating to assist in preventing and detecting unauthorized copying of digital content, and more specifically, digital cinema content (e.g., digital movie). The first protection layer 22 operates to monitor and record unauthorized activity, for example in a movie theater (e.g., unauthorized recording of a digital movie using a camcorder). The second protection layer 24 operates to provide camcorder visible data embedding to embed a strong copy mark into the recorded copy of the digital content (e.g., digital movie). The embedded camcorder visible data may or may not introduce significant objects to the host movie. The third protection layer 26 operates to provide digital watermarking that embeds imperceptible visible identification information (e.g., copyright owner information) in the host movie on-the-fly.

It should be noted that in each layer, several parallel protection subsystems that use the same or different protection schemes may be provided. For example, two parallel copy mark subsystems may be provided in the second layer that use two different kinds of protection schemes. Additionally, the output of a layer or layers may be used in another layer to further enhance the security capability of the multilayer digital cinema content protection system 20.

In general, and with respect to a digital theater application, the different layers of the multilayer digital cinema content protection system 20 may begin operation at different times. For example, the first protection layer 22 may begin to operate as soon as audiences enter the theatre and continues through the playback of the movie or movies. The second and third protection layers 24, 26 may begin to operate once any movie is in play. Further, these two protection layers 24, 26 may operate simultaneously, in a synchronized fashion, or in a non-synchronized fashion. When an unauthorized copy of a movie is located in distribution, the messages embedded using the second and the third protection layers 24, 26 may be decoded by the content provider or an authorized entity for tracing (e.g., determining the source or location of the unauthorized copy).

Figure 2:
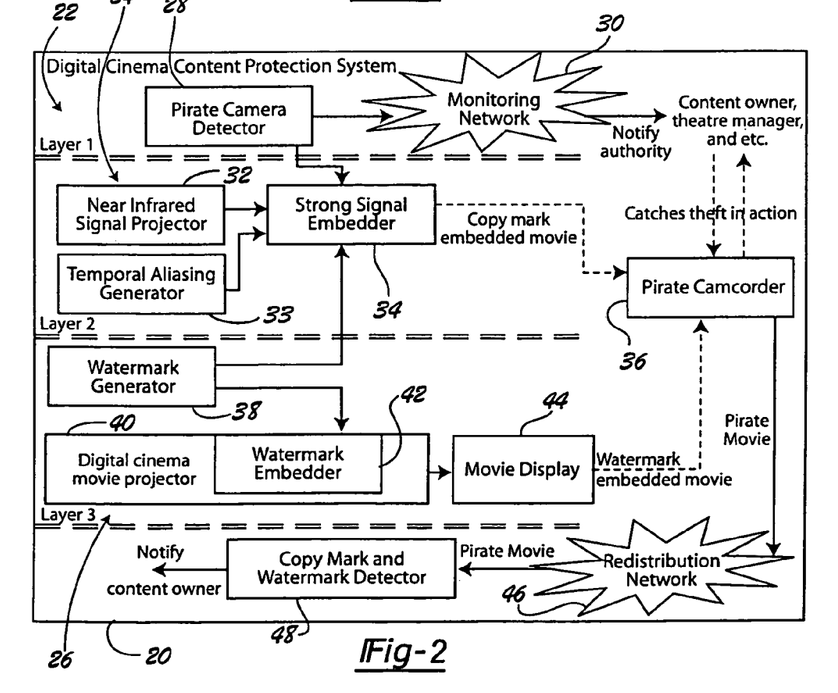
FIG. 2 is a detailed block diagram representative of some configurations of the multilayer digital cinema content protection system of FIG. 1.

Referring now to FIG. 2, some configurations of a multilayer digital cinema content protection system 20 of the present invention are represented in more detail therein. Specifically, the first protection layer 22 includes a camera detector 28 (e.g., pirate camera detector) for detecting the presence of a recording device (e.g., camcorder) performing unauthorized recording or copying of digital content, for example, unauthorized recording of a digital movie in a theater. The camera detector 28 further communicates with a monitoring network 30 to provide notification of unauthorized activity (e.g., recording of digital movie in a theater). This notification may be provided to different entities to allow for appropriate action to be taken. For example, the notification may be provided to law enforcement authorities to respond to the activity, to the content owner to determine what action should be taken, or to the theater manager to determine appropriate action to be taken, to name just a few.

The second protection layer 24 in this configuration includes a near infrared signal projector 32 and a temporal aliasing generator 33 connected to a strong signal embedder 34 that disturbs the unauthorized activity (e.g., recording by a pirate camcorder 36) and degrades the quality of such activity (e.g., degrades the quality of the recorded movie).

The strong signal embedder 34 is also connected to a watermark generator 38, which is provided as part of the third protection layer 26, and that provides a strong invisible identification imprint (e.g., copyright owner information) onto the recorded copy of the digital content.

The third protection layer 26 includes the watermark generator 38 in connection with a digital cinema movie projector 40 having a watermark embedder 42. The watermark embedder 42 embeds an imperceptible visible digital watermark into the movie on the fly during movie playback (e.g., public viewing on a movie display 44) immediately after decryption. This imperceptible visible watermark is recorded by the pirate camcorder 36 or any recording device that attempts to record the movie in a clear format (i.e., not encrypted).

In particular, the camera detector 28 may be implemented using, for example, two surveillance cameras, and preferably more than one surveillance camera. The surveillance camera uses infrared technology such that it can detect objects (e.g., camcorder) in, for example, a dark theater. Pattern recognition techniques are employed to detect camera lenses in the theater as are known. The near infrared signal projector 32 may be a simple infrared light source or more complex infrared projectors depending upon system requirements or needs. The temporal aliasing generator 33, which is preferably provided as part of a film projector, modulates the pixel scan time and the pixel hue, intensity, and saturation based on a copy mark bit $w_{CM}$ as described herein, such that aliasing that is visible to, for example, a camcorder, but not human eyes, is generated.

It should be noted that modifications to the manner in which the copy mark is embedded such that it is visible by the camcorder, but imperceptible to human, may be provided. For example, depending on the intensity of the signal, the intensity of the infrared or the aliasing, the copy mark may introduce significant objects or artifacts to the recorded movie (e.g., camcorder recorded movie). As another example, aliasing and imperceptible sound technologies may be used to embed a copy mark to the audio track such that it is inaudible to humans, but recordable by the recorder. Thus, if there is only an audio recorder (i.e., no camcorder) present in the theatre recording a pirate copy of the audio track of a movie, such implementation will enhance the system security capability to degrade the copy of the audio track and the embedded copy mark may be used to track illegal distribution of the audio copy.

Using various configurations of multilayer digital cinema content protection systems 20 of the present invention, unauthorized activity (e.g., unauthorized copying or recording of a digital movie in a theater by a camcorder or by a digital audio recorder) is resisted, and may be prevented, with notification of such unauthorized activity provided. Also, detection of imprinted identification in, for example, the pirate copied movie that is distributed through a redistribution network 46 is provided thereafter by a copy mark and watermark detector 48. Further, by providing multiple levels of protection, such protection is maximized. In particular, the first protection layer 22 may detect the pirate or unauthorized activity and stop it before the illegal copy is distributed.

The second protection layer 24 may imbed large amounts of distortions or other artifacts onto the recorded pirate copy of the movie to distort and devalue the copy, thereby decreasing the likelihood of redistribution of the movie without authorization. The second protection layer 24 also may impose a strong copy mark onto the recorded copy of the movie such that it survives signal transformations and attacks. In the event an illegal copy is located, tracking the recording information may then be performed.

The third protection layer 26, in addition to embedding an invisible watermark that may be imprinted permanently onto the movie to track illegal distribution of, for example, a theatre camcorder or audio recorder recorded copy, may be used to track illegal distribution of a copy made at the movie projector when the encrypted movie data is being decrypted. Information (e.g., seat location, pirate image, etc.) from the surveillance camera in the first protection layer 22, in combination with recorded information, may be used to generate the copy mark $W_{CM}$ and the watermark $W_M$ as described herein. Further, in the second protection layer 24, part of this information, such as the pirate image, may be used to generate the distortions or artifacts. For example, the pirate copy of the movie may have a dark image, an iconified image, a black and white image, a low resolution image, an impression, or an illustration of the pirate superimposed on part of the movie, such that the distortions are viewable to the audiences of the pirated movie. An indicator bit may also be used to indicate the existence of the watermark in the copy mark or the copy mark in the watermark.

Figure 3:
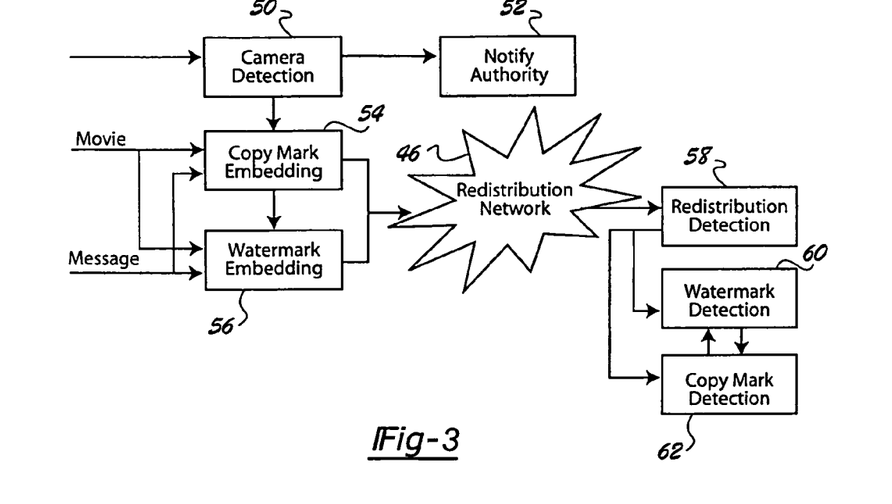
FIG. 3 is a block diagram showing generally the operation of some configurations of multilayer digital cinema content protection systems represented by FIG. 1.

In general, and as shown in FIG. 3, multilayer digital cinema content protection system embodiments 20 provide for recording device (e.g., camera or camcorder) detection at 50 using the first protection layer 22. Upon detection of the unauthorized activity (e.g., copying or recording of a digital movie), notification is provided at 52, for example by notifying law enforcement authorities. Upon detection of the unauthorized activity, or continuously during the playing of the digital movie, the near infrared signal projector 32 and/or the temporal aliasing generator 33 may project a strong signal to degrade the quality of the unauthorized activity (e.g., recording of digital movie using a camcorder 36). Further, the second protection layer 24 at 54 provides identification embedding and the third protection layer 26 at 56 provides watermark embedding, together allowing for later detection of the unauthorized activity. The configurations of the various systems and methods as described herein are not limited in their operation to the order in which they are described. Further, the configurations of the various systems and methods as described herein may be implemented together (e.g., simultaneously) or separately (e.g., at different times). For example, camera detection at 50 may be provided continuously during operating hours of a theater, while the operation of the near infrared signal projector 32 may only be operational during the showing of a digital movie.

Therefore, using configurations of the multilayer digital cinema content protection system 20, when, for example, an unauthorized copy of a digital movie is distributed through the redistribution network 46, redistribution detection is provided at 58, watermark detection is provided at 60 and embedded identification detection (e.g., copy mark detection) is provided at 62.

Figure 4:
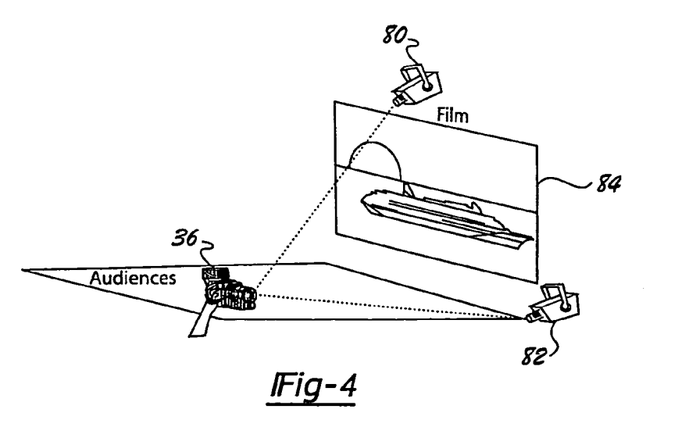
FIG. 4 is a perspective view of surveillance cameras implemented in a first protection layer of some configurations of a multilayer digital cinema content protection system represented by FIG. 1.

Having described generally the overall operation of some configurations of a multilayer digital cinema content protection system 20, a detailed operational description of the operation of each of protection layers 22, 24, 26 in various configurations will now be provided. Specifically, the first protection layer 22 generally provides detection of unauthorized activity (e.g., recording of a digital movie), particularly in a digital theater. Digital content is preferably encrypted and sent to a theatre via a secure digital cinema content distribution network (SDC CND). At the theatre, and according to some configurations of the present invention, a set of at least two surveillance cameras 80, 82 may be installed as shown in FIG. 4. The camera detector 28 initiates operation of the set of surveillance cameras 80, 82 when the theatre opens or shortly thereafter (e.g., before the first movie of the day is to be played). The set of surveillance cameras 80, 82 are enabled to detect a digital camera or camcorder within the theater via a lens detection system using pattern recognition. For example, a training database as is known may be used. Specifically, a decision based Neural Network algorithm may be used to classify the object into the lens, near lens, and non-lens. Specifically, assume Z is the input, Z' is the output, $\Omega$ is the weight, and $\theta_1$, $\theta_2$ are thresholds. The following linear perceptron discriminant function is then used: $Z'_1 = \Sigma \omega_j z_j + \theta_1$, $Z'_2 = \Sigma \omega_j z_j \theta_2$, and classified as a lens category if $Z'_1 > 0$ & $Z'_2 > 0$. If a camera or camcorder 36 is detected, notification is provided to, for example, a theater manager or the content distributor for further action, which may include calling law enforcement. Notification may be provided, for example, by a visual signal (e.g., alarm light) or audible alarm within the movie projector booth, but notification is not limited to these types of signals or alarms. For example, email or other electronic notification may also be provided.

In some configurations, the location of the detected camera (Lc) may be recorded and used by the second or third protection layers 24, 26 to specifically target the offending device (e.g., camcorder) to concentrate the infrared signal and embedding information. For example, the copy mark $W_{CM}$ and the watermark $W_M$ provided by the second and third protection layers 24, 26 may be functions of Lc. Thus, should additional information be needed or required (e.g., location of camcorder in theater) for tracking the illegal copy and distribution of copied digital cinema movies, such information is available (e.g., stored electronically).

With respect to identifying the presence of an offending or unauthorized device (e.g., camcorder 36) in a theater using the set of surveillance cameras 80, 82, if a camcorder 36 can successfully record a movie playing in a digital cinema (e.g., showing on a movie screen 84), then there exists at least one location (L) for a surveillance camera 80, 82, such that the camcorder 36 is within visible range of one of the set of surveillance cameras 80, 82 as illustrated in FIG. 4. For example, if Lc, the location of the camcorder is not directly viewable from any location L in the theatre during and before the movie playback, i.e., for $\forall$ L, $\exists$ an object $Ob_L$ between L and Lc for $\forall t \in [0,T]$ from the time the camcorder enters the theatre to the time it exits. Thus, there exists such an $Ob_s$ such that $Ob_s$ is between the movie screen (L) and the camcorder (Lc), i.e., the camcorder cannot 'see' the movie screen, therefore, it cannot record the movie successfully. Thus, if a camcorder is reading the movie it is detectable by the set of surveillance cameras 80, 82. Therefore, using the first protection layer 22, detection of an offending or unauthorized device in, for example, a movie theater is provided. This allows for notification of such unauthorized activity and may provide for halting the activity (e.g., calling law enforcement) before much digital content has been recorded or copied.

The second protection layer 24 provides for resisting or preventing unauthorized activity, and/or embedding identification information in the unauthorized copies of the digital content for later detection. The second protection layer 24 provides a strong camcorder recordable signal to degrade the quality of copies made, for example in a theater using a camcorder 36, and also embeds a strong invisible identification mark imprint on the unauthorized copy of the digital content.

Specifically, the second protection layer 24 includes the near infrared projector 32 and the temporal aliasing generator 33 in combination with the strong signal embedder 34 that projects a strong signal, such as near infrared light or temporal aliasing that is not visible to the human eye, but visible to the camcorder, or inaudible to human ears, but recordable by the camcorder or audio recorder, and disturbs the unauthorized activity (e.g., camcorder recoding). The near infrared light may degrade the quality of the recorded copy of the digital content (e.g., digital movie) because charge-coupled devices (CCDs) used for imaging in many camcorders are sensitive to near infrared.

The second protection layer 24 also provides for imprinting a strong invisible identification mark (e.g., copyright owner information) onto the camcorder recorded copy of the digital content using the near infrared signal projector 32 and the temporal aliasing generator 33 in combination with the strong signal embedder 34. The near infrared signal projector 32 modulates the infrared signal magnitude, frequency, and or phase at time t to embed the copy mark bit $w_{CM}$: $IR'(t) = IR(t) \cdot \zeta(w_{CM})$, such that the recorded video frame s" at time t is a modified version of the projected video frame s' with the copy mark embedded as follows: $s''(x,y,t) = s'(x,y,t) + f(IR'(t))$. More particularly, in some configurations, an enforcement based marking algorithm is provided that provides for high transformation survivability. Specifically, $W_{CM} = w_{CM}$ (i), i=1, and N is the copy mark to be embedded. Let f1, f2, and f3 be functions of one or more of the following parameters: the video frame number s, the theatre identification (ID), copyright (CP), usage rules (R), date (D), time (T), location (Lc), and a pirate image (e.g., illustration, very low resolution picture, an iconified image or an impression) (IM). Let v be a wavelength of the near infrared and m be a predefined magnitude of the near infrared. The wavelength, magnitude, and area of affected region of the near infrared projected onto the tampering camcorder are defined using the following equations:

$$V(s) = v + \alpha W \cdot f1(s, ID, CP, R, D, T, Lc, IM); \quad (1)$$

$$M(s) = m + \beta W \cdot f2(s, ID, CP, R, D, T, Lc, IM); \text{ and} \quad (2)$$

$$A(x,y) = W \cdot f3(s, ID, CP, R, D, T, Lc, IM) \quad (3)$$

Where $\alpha$ and $\beta$ are weighting functions and s, ID, CP, R, D, T, Lc, and IM are optional parameters of f1, f2, and f3.

Further, V'(s) and M'(s) are the extracted approximate wavelength and magnitude of the near infrared at each frame. Additionally, $w'_{CM}(i) = 1$ if $\Sigma_{s \in Si} V'(s) < Vx$ and w'(i)=0, or w'(i)=1 if $\Sigma_{s \in Si} M'(s) < Mx$ and w'(i)=0; or w'(i)=1 if $\Sigma_{s \in Si} V'(s) < Ax$ and w'(i)=0. Due to infrared filtering, limited wavelengths can survive. Thus, some configurations use detection results based on M or A rather than a detection result based on V. The algorithm is enforcement based so that it does not depend on the exact position of a single frame or a single block of pixels. Additionally, because the hidden information is embedded into the camcorder recorded copy via a secondary human imperceptible information source instead of embedded into the host media in the conventional way of digital watermarking, improved detection is provided (e.g., no artifacts are introduced into the host signal that are perceptible to humans).

Figure 6A:
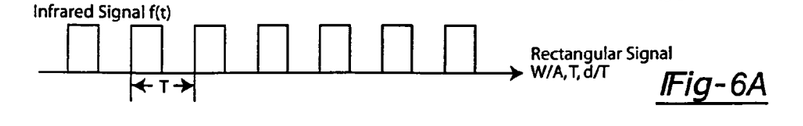
FIGS. 6(a) and 6(b) are signal diagrams showing exemplary signals suitable for use in embedding watermarks in digital content utilizing configurations of the multilayer digital cinema content protection system represented in FIG. 1.
Figure 6B:
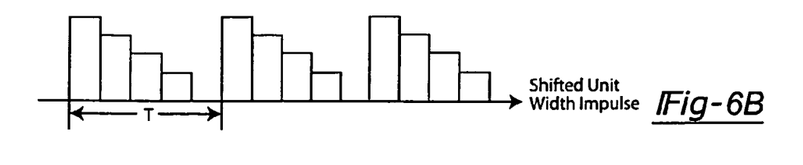

In some configurations, the hidden data (e.g., strong invisible copy mark imprint) is embedded using amplitude and frequency modulation as shown in exemplary form in FIGS. 6(a) and 6(b), and wherein $V'(t) = V(t) + \alpha W f(t)$. Further, the copy mark (e.g., invisible hidden data) is configured for decoding using appropriate decoding keys, thus preventing unauthorized decoding or removal of the watermarks without the key.

In other configurations, the temporal aliasing generator 33 provided as part of a film projector modulates the pixel scan time and the pixel hue, intensity, and saturation based on the copy mark bit $w_{CM}$, such that aliasing that is visible and/or audible to the camcorder, but not human eyes and/or ears, is generated. In other additional configurations, the temporal aliasing generator 33 provided as part of a film projector modulates the pixel scan time only to generate aliasing effect to introduce both artifacts and a hidden copy mark to the camcorder or audio recorder recorded copy of the movie or the sound track.

The third protection layer 26 provides for on the fly digital watermarking with a robust, imperceptible visible digital watermark embedded into the digital content (e.g., digital movie) at playback time. Various configurations suitable for implementing the third protection layer 26 are described in co-pending U.S. patent application entitled "METHODS AND APPARATUS FOR DIGITAL WATERMARKING AND WATERMARK DECODING", filed on Sep. 27, 2002, having Ser. No. 10/259,106, the entire disclosure of which is incorporated herein by reference. Additionally, temporal deviation modulation based watermarking that provides high robustness over camcorder/audio recorder recording can be used and is defined as follows: s'(x,y,t)=s(x,y,t)+$d_t$ (s)·f($w_M$) on visual data and s'(x,t)=s(x,t)+$d_t$(s)·f($w_M$) on audio data where $w_M$ is a watermark bit, $W_M$=$w_M$ (i), i=1,N* is the watermark to be embedded, and which may be a function of the theatre identification (ID,) copyright (CP,) usage rules (R,) the date (D,) time (T,) location (Lc,) and/or an image of the pirate (IM.)

Thus, using configurations of the present invention to implement a multilayer digital cinema content protection system 20, resisting or preventing of unauthorized activity in a digital cinema application is provided, and detecting of the unauthorized activity is also provided. Two layers of imperceptible signals, one camcorder visible copy mark and one camcorder invisible watermark, are inserted or embedded into, for example, an unauthorized copy of digital content during playback time in a digital cinema. Using the watermarking algorithms described herein, which are well suited for digital cinema applications, higher tractability and higher level of protection capability are achieved. In particular, three layer digital cinema content protection systems as described herein may provide such functionality. In such configurations, the first protection layer 22 includes a set of surveillance cameras that detect unauthorized activity by a camcorder, and may be used to halt the activity while in progress. The second protection layer 24 provides for superimposing, in real time, an invisible robust copy mark on a camcorder recorded copy of the digital content using near infrared light. The third protection layer 26 embeds in real time, a robust imperceptible visible watermark using video processing techniques. The multilayer digital cinema content protection system 20, including the three layer system described herein may be incorporated into a digital cinema digital rights management (DC DRM) system.

Figure 5:
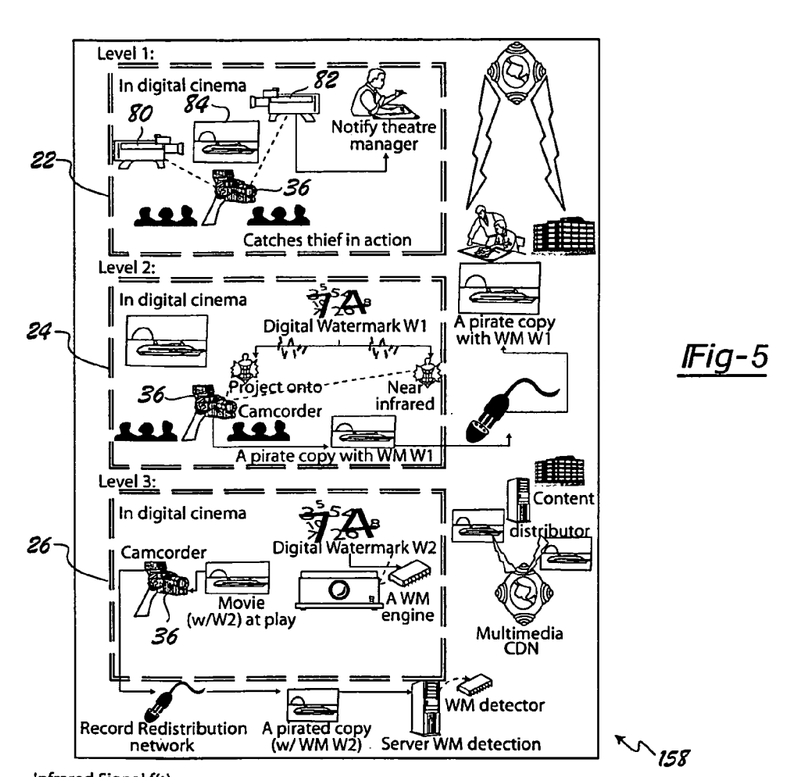
FIG. 5 is another block diagram representative of various configurations of the multilayer digital cinema content protection system of FIG. 1.

When reference is made herein to a copy mark, this refers to an infrared projected or a aliasing generator cast hidden mark, and when reference is made to a watermark, this refers to a digital watermark inserted via signal modification. Thus, some multilayer digital cinema content protection system 20 configurations may result in, for example, a three layer system digital content protection system 100 for a digital cinema application as shown in FIG. 5. However, one skilled in art will appreciate that the different configurations of multilayer digital cinema content protection systems 20 may be provided for different system requirements and specifications. For example, strong synchronization via infrared embedding may be provided. In such configurations, error resilient synchronization for watermark decoding is provided with the infrared used to set synchronization marks for signal processing based watermark embedding. Digital cinema video display frequency differs from that of camcorder recording. Thus, temporal based watermarking needs strong synchronization for robust decoding. If T=ω/2π, and $$IR(t) = \sum_{k=0}^{K} \frac{1}{2k+1} \sin((2k=1)\omega t).,$$

then to embed a watermark bit $w_m$, the following equations are used:

$$Y = X + w_m = X + f(w_m^* IR(t)), t \in \left[0, \frac{T}{2}\right]; \text{ and} \quad (4)$$

$$Y = X + w_m = X + f(w_m^* IR(t - T/2)), t \in \left[\frac{T}{2}, T\right]. \quad (5)$$

Further, and for example, nonlinear watermark energy distribution may be provided. In such configurations it is recognized that it is desirable to have as much information as possible at the time of tracking illegal distribution. However, the tradeoff between robustness and capacity suggests a shorter watermark to provide for better survivability over a wide range of signal processing attacks. For a watermark $W_m$ of N information units, it is often possible to partition the $W_m$ into most important Wm, somewhat important Ws, and least important WI sets. Thus, some configurations of the present invention embed Wm most robustly while WI is embedded with least robustness to better utilize robustness-capacity tradeoff and improve performance. For example, the date and time period information can be considered more important than the exact time in terms of hours, minutes, and seconds for tracking purposes. Therefore, the date information may be classified as Wm while the exact hour, minutes, and seconds classified as WI. Thus, "July 2002" requires a lower bit rate for transmission than "evening of Jul. $1^{st}$, 2002" while "evening of Jul. $1^{st}$, 2002" requires a lower bit rate for transmission than "8:23:38 pm Jul. $1^{st}$, 2002". By giving more energy to Wm and less to WI, higher survivability of Wm over a wide range of attempted unauthorized activity may be provided. Wm may be imprinted via both camcorder visible and invisible marking systems, while WI is only embedded using conventional camcorder invisible signal processing. Further, Ws may be embedded using a less robust camcorder visible mark (compared with Wm) and a more robust camcorder invisible mark (compared with WI).

In some configurations of the present invention, joint offline and online marking are utilized. In such configurations, it is recognized that the size of information to process is often proportional to the time required for processing. While it is desirable to have as much information as possible for tracing and tracking purposes, the time required to process (or to hide) the large amount of information is more, thus making it harder to achieve real time on the fly watermarking for digital cinema applications. However, most of the information to hide is already available before the content is played back, thereby simplifying a joint offline and online marking system. For example, time sensitive information may be embedded during playback in real time while other information can be processed offline.

Further, in some configurations of the present invention, it should be noted that when the movie is playing in a home-based digital theatre, the first protection layer 22 and part of the second protection layer 24 may not be available. However, the multilayer digital cinema content protection system 20 may be modified to include other layers of protection for preventing and further tracking unauthorized distributions.

Thus, using configurations of the present invention for implementing a multilayer digital cinema content protection system 20, multiple electronic marks and multiple protection are provided. Further, a more robust algorithm and system methodology targeting a digital cinema application for higher tractability are provided. Additionally, surveillance cameras are provided to detect unauthorized activity while it is occurring, thus increasing the likelihood that the individual performing the unauthorized activity is caught. The temporal aliasing generator 33 and the digital watermark embedder 42, which may be provided as part of a digital movie projector, allow for embedding two layers of signals, one copy mark and one watermark, into the pirate recorder, camcorder or audio recorder. The aliasing generator 33 also allows for the introduction of strong artifacts onto the pirate copy of the movie. Thus, the pirate copy is much lower quality, such that the value for redistributing the copy is reduced.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A content protection system for digital cinema comprising:
    a first protection layer having a camera detector including at least two surveillance cameras configured to detect recording devices within a theater using automatic pattern recognition;
    a second protection layer having a near infrared signal projector and a strong signal embedder together configured to embed an imperceptible recording device visible copy mark in a recorded copy of digital content being displayed in the theater; and
    a third protection layer having a watermark generator and a watermark embedder, the watermark embedder provided in conjunction with a digital cinema movie projector and, in combination with the watermark generator, are together configured to embed an imperceptible recording device invisible watermark in the digital content displayed in the theater by the digital cinema movie projector,
    wherein a location of a detected recording device producing the recorded copy is used by at least one of said second or third protection layers to specifically target the recording device by generating at least one of the electronic copy mark or the electronic watermark as a function of the location.

2. The content protection system according to claim 1, wherein the first protection layer comprises at least two surveillance cameras.

3. The content protection system according to claim 2, wherein the first protection layer is configured to provide notification of an unauthorized recording device observed by at least one of the surveillance cameras.

4. The content protection system according to claim 3, wherein the recording device comprises a camcorder and the first protection layer is configured to detect the camcorder in a movie theater using a lens detection system.

5. The content protection system according to claim 1, wherein the second protection layer comprise a near infrared signal projector for degrading using near infrared light the quality of digital content copied in digital cinema.

6. The content protection system according to claim 1, wherein the third protection layer comprises a watermark embedder for embedding a recording device invisible electronic watermark into digital content provided in digital cinema.

7. The content protection system according to claim 6, wherein the second protection layer comprises a strong signal embedder and in combination with the watermark embedder are configured to embed a recording device invisible electronic watermark into digital content provided in digital cinema.

8. The content protection system according to claim 1, wherein the first protection layer is configured to begin operating upon an opening of a theater providing digital cinema.

9. The content protection system according to claim 1, wherein the second protection layer is configured to begin operating upon the start of displaying a digital movie in a theater.

10. The content protection system according to claim 1, wherein the third protection layer is configured to begin operating upon the start of displaying a digital movie in a theater.

11. The content protection system according to claim 1, wherein the second protection layer and third protection layer are configured to operate simultaneously.

12. The content protection system according to claim 1, wherein the second protection layer and third protection layer are configured to operate in synchronization.

13. The content protection system according to claim 1, wherein the second protection layer and third protection layer are configured to operate non-synchronously.

14. The content protection system according to claim 1, wherein the electronic copy mark is visible to the recording device and the electronic watermark is invisible to the recording device.

15. The content protection system according to claim 1, wherein the second and third protection layers are configured to operate nonlinearly to embed the electronic watermarks into digital content provided in digital cinema.

16. A digital content protection system for protecting digital content displayed in a theater, the digital content protection system comprising:
    a first protection layer having a camera detector including at least two surveillance cameras configured to detect recording devices within a theater using automatic pattern recognition;
    a second protection layer having a near infrared signal projector and a strong signal embedder together configured to embed an imperceptible recording device visible copy mark in a recorded copy of digital content being displayed in the theater, wherein a location of a detected recording device recording the copy of the digital content being displayed in the theater is used by the second protection layer to specifically target the recording device by concentrating an infrared signal; and a third protection layer having a watermark generator and a watermark embedder, the watermark embedder provided in conjunction with a digital cinema movie projector and, in combination with the watermark generator, are together configured to embed an imperceptible recording device invisible watermark in the digital content displayed in the theater by the digital cinema movie projector, wherein a location of a detected recording device is used by the third protection layer to specifically target the recording device by concentrating embedding information.

17. The digital content protection system according to claim 16, further comprising a copy mark and watermark detector for detecting embedded copy marks and watermarks in digital content.

18. The digital content protection system according to claim 17, wherein the copy mark and watermark detector is configured to decode the recording device visible copy mark using one or more decoding keys.

19. The digital content protection system according to claim 16, further comprising a monitoring component configured to provide notification of a recording device detected within the theater by the camera detector.

20. The digital content protection system according to claim 16, wherein the recording device is one of a video recorder and an audio recorder, and the second protection layer is configured to embed the imperceptible recording device visible copy mark on a recording device a recording device recorded copy of digital video content or audio content.

21. A method of protecting content in digital cinema comprising:
monitoring for the presence of recording devices using automatic pattern recognition, including employing a first protection layer having a camera detector including at least two surveillance cameras configured to detect recording devices within a theater using automatic pattern recognition;
embedding a recording device visible electronic copy mark into digital content recorded by a recording device, including employing a second protection layer having a near infrared signal projector and a strong signal embedder together configured to embed an imperceptible recording device visible copy mark in a recorded copy of digital content being displayed in the theater; and
embedding a recording device invisible electronic watermark into digital content recorded by the recording device, including employing a third protection layer having a watermark generator and a watermark embedder, the watermark embedder provided in conjunction with a digital cinema movie projector and, in combination with the watermark generator, are together configured to embed an imperceptible recording device invisible watermark in the digital content displayed in the theater by the digital cinema movie projector,
wherein a location of a detected recording device producing the recorded copy is used by at least one of said second or third protection layers to specifically target the recording device by generating at least one of the electronic cony mark or the electronic watermark as a function of the location.

22. The method according to claim 21, wherein the recording device is a camcorder and further comprising detecting the presence of the camcorder in the theater and providing notification of the presence of the camcorder.

23. The method according to claim 21, further comprising decoding the recording device invisible electronic watermark using one or more decoding keys.

24. The method according to claim 21, wherein the step of embedding an electronic copy mark into digital content comprises using near infrared light to embed the electronic copy mark.

25. The method according to claim 21 wherein the step of monitoring comprises using lens detection to detect the presence of recording devices in the theater.

26. The method according to claim 21 wherein the monitoring starts upon an opening of the theater providing digital content.

27. The method according to claim 21 wherein the embedding of the recording device visible electronic watermark starts upon the start of displaying a digital movie in the theater.

28. The method according to claim 21 wherein the embedding of the recording device invisible electronic watermark starts upon the start of displaying a digital movie in the theater.

29. The method according to claim 21 wherein the steps of embedding are performed simultaneously.

30. The method according to claim 21 wherein the steps of embedding are performed synchronously.

31. The method according to claim 21 wherein the steps of embedding are performed asynchronously.

32. The method according to claim 21 wherein the electronic watermarks are embedded nonlinearly.

* * * * *

UNITED STATES PATENT AND TRADEMARK OFFICE
CERTIFICATE OF CORRECTION

PATENT NO. : 7,006,630 B2  Page 1 of 1
APPLICATION NO. : 10/453407
DATED : February 28, 2006
INVENTOR(S) : Hong H. Yu et al.

It is certified that error appears in the above-identified patent and that said Letters Patent is hereby corrected as shown below:

Col. 12, Line 8, Claim 5:
"comprise" should be --comprises--

Col. 14, Line 12, Claim 21:
"cony" should be --copy--

Signed and Sealed this

Twenty-second Day of August, 2006

JON W. DUDAS
*Director of the United States Patent and Trademark Office*